(12) United States Patent
Sunada et al.

(10) Patent No.: US 10,222,917 B2
(45) Date of Patent: Mar. 5, 2019

(54) PATTERN FORMATION METHOD

(71) Applicant: MITSUBISHI PAPER MILLS LIMITED, Sumida-ku, Tokyo (JP)

(72) Inventors: Kazuhiko Sunada, Sumida-ku (JP); Takenobu Yoshiki, Sumida-ku (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 0 days.

(21) Appl. No.: 15/554,230

(22) PCT Filed: Feb. 22, 2016

(86) PCT No.: PCT/JP2016/055055
§ 371 (c)(1),
(2) Date: Aug. 29, 2017

(87) PCT Pub. No.: WO2016/147805
PCT Pub. Date: Sep. 22, 2016

(65) Prior Publication Data
US 2018/0081464 A1    Mar. 22, 2018

(30) Foreign Application Priority Data

Mar. 19, 2015    (JP) ................................. 2015-056497

(51) Int. Cl.
*B05D 5/12* (2006.01)
*G06F 3/044* (2006.01)
(Continued)

(52) U.S. Cl.
CPC ............... *G06F 3/044* (2013.01); *H01B 5/14* (2013.01); *G06F 2203/04103* (2013.01); *G06F 2203/04112* (2013.01); *H01B 13/0036* (2013.01)

(58) Field of Classification Search
None
See application file for complete search history.

(56) References Cited

U.S. PATENT DOCUMENTS

| 2009/0277672 A1 | 11/2009 | Matsumoto |
| 2012/0187821 A1 | 7/2012 | Lee et al. |

(Continued)

FOREIGN PATENT DOCUMENTS

| JP | 2003-077350 | 3/2003 |
| JP | 2005-250169 | 9/2005 |

(Continued)

OTHER PUBLICATIONS

Mathematical Model of Territories—Introduction to Mathematical Engineering through Voronoi diagrams (published by Kyoritsu Shuppan in Feb. 2009) with partial English translation.

*Primary Examiner* — Austin Murata
(74) *Attorney, Agent, or Firm* — Venable LLP

(57) ABSTRACT

A pattern formation method produces a random metal pattern that does not cause moire even when placed over a liquid crystal display and achieves improved detection sensitivity due to compressed variation in electrical properties among sensors. The method forms a patterned optically transparent and electrically conductive assembly having an optically transparent and electrically conductive layer on an optically transparent support. The conductive layer has sensor parts electrically connected to terminal parts and dummy parts not electrically connected to terminal parts, with the sensor and dummy parts having a metal mesh pattern. The metal mesh pattern has a mesh shape formed of a Voronoi diagram generated from a plurality of generators disposed on a plane, at least some of the generators in the dummy parts being present in an enlarged polygons that share the gravity center with polygons used in the tiling of the plane and/or at least some of the generators in the sensor parts being present in reduced polygons that share the gravity center with polygons used in the tiling of the plane. By these features, at least some of the polygons of the (Continued)

generators in the dummy parts are larger than at least some of the polygons of the generators in the sensor parts.

2 Claims, 7 Drawing Sheets

(51) Int. Cl.
  *H01B 5/14* (2006.01)
  *H01B 13/00* (2006.01)

(56) References Cited

U.S. PATENT DOCUMENTS

| | | |
|---|---|---|
| 2013/0028503 A1 | 1/2013 | Wakui et al. |
| 2013/0215067 A1 | 8/2013 | Hwang et al. |
| 2013/0222328 A1* | 8/2013 | Cok ..................... G06F 3/044 345/174 |
| 2014/0055380 A1 | 2/2014 | Han et al. |
| 2014/0111711 A1 | 4/2014 | Iwami et al. |
| 2014/0198269 A1 | 7/2014 | Hwang et al. |
| 2014/0332262 A1 | 11/2014 | Yoshiki |
| 2015/0177876 A1* | 6/2015 | Ishii ..................... G06F 3/044 345/174 |
| 2015/0378485 A1 | 12/2015 | Nakamura |

FOREIGN PATENT DOCUMENTS

| | | | | |
|---|---|---|---|---|
| JP | 2007-188655 | 7/2007 | | |
| JP | 2007-287953 | 11/2007 | | |
| JP | 2007-287994 | 11/2007 | | |
| JP | 2011-216377 | 10/2011 | | |
| JP | 2013-030378 | 2/2013 | | |
| JP | 2013-037683 | 2/2013 | | |
| JP | 2013-540331 | 10/2013 | | |
| JP | 2014-017519 | 1/2014 | | |
| JP | WO 2014010620 A1 * | 1/2014 | ............. | G06F 3/044 |
| JP | 2014-041589 | 3/2014 | | |
| JP | 2014-529841 | 11/2014 | | |
| WO | 2014/136584 | 9/2014 | | |

* cited by examiner

PATTERN FORMATION METHOD

This application is a national phase of PCT Application No. PCT/JP2016/055055 filed Feb. 22, 2016, which in turn claims benefit of Japanese Patent Application No. 2015-056497 filed Mar. 19, 2015.

TECHNICAL FIELD

The present invention relates to a method for forming a pattern of an optically conductive material mainly used for touchscreens. In particular, the present invention relates to a pattern formation method suitable for producing an optically transparent electrode of a projected capacitive touchscreen.

BACKGROUND ART

In electronic devices, such as personal digital assistants (PDAs), laptop computers, office automation equipment, medical equipment, and car navigation systems, touchscreens are widely used as their display screens that also serve as input means.

There are a variety of touchscreens that utilize different position detection technologies, such as optical, ultrasonic, surface capacitive, projected capacitive, and resistive technologies. A resistive touchscreen has a configuration in which an optically transparent conductive material and a glass plate with an optically transparent conductive layer are separated by spacers and face each other so as to function as a touchsensor formed of an optically transparent electrode. A current is applied to the optically transparent conductive material and the voltage of the glass plate with an optically transparent conductive layer is measured. In contrast, a capacitive touchscreen has a basic configuration in which a touchsensor formed of an optically transparent electrode is an optically transparent conductive material having an optically transparent conductive layer provided on a base material and there are no movable parts. Capacitive touchscreens are used in various applications due to their high durability and high light transmission rate. Further, a touchscreen utilizing projected capacitive technology allows simultaneous multipoint detection, and therefore is widely used for smartphones, tablet PCs, etc.

As an optically transparent conductive material used for touchscreens, those having an optically transparent conductive layer made of an ITO (indium tin oxide) film formed on a base material have conventionally been used. However, there has been a problem of decrease in light transmission rate due to high refractive index and high surface light reflectivity of ITO conductive films. In addition, due to low flexibility, the ITO conductive film is prone to crack when bent, resulting in increased electric resistance of the optically transparent conductive material.

Known as an optically transparent conductive material having, on an optically transparent support, an optically transparent conductive layer different from an ITO conductive film is an optically transparent conductive material having a mesh pattern of metal thin lines with appropriately adjusted line width, pitch, pattern shape, etc., for example. This technology provides an optically transparent conductive material which maintains a high light transmittance and which has a high electrical conductivity. Regarding the shape of the mesh pattern of metal thin lines (hereinafter also written as metal pattern), it is known that a repetition unit of any shape can be used. For example, in Patent Literature 1, a triangle, such as an equilateral triangle, an isosceles triangle, and a right triangle; a quadrangle, such as a square, a rectangle, a rhombus, a parallelogram, and a trapezoid; a (regular) n-sided polygon, such as a (regular) hexagon, a (regular) octagon, a (regular) dodecagon, and a (regular) icosagon; a circle; an ellipse; and a star, and a combinational pattern of two or more thereof are disclosed.

As a method for producing the above-mentioned optically transparent conductive material having a metal mesh pattern, a semi-additive method for forming a metal pattern, the method comprising forming a thin catalyst layer on a support, forming a resist pattern on the catalyst layer, forming a laminated metal layer in an opening of the resist by plating, and finally removing the resist layer and the base metal protected by the resist layer, is disclosed in, for example, Patent Literature 2, 3, etc.

Also, in recent years, a method in which a silver halide diffusion transfer process is employed using a silver halide photosensitive material as a precursor to a conductive material has come to be known. For example, disclosed in Patent Literature 4, 5, 6, etc. is a technique for forming a metal (silver) pattern by subjecting a silver halide photosensitive material (a conductive material precursor) having, on a support, a physical development nuclei layer and a silver halide emulsion layer in this order to a reaction with a soluble silver halide forming agent and a reducing agent in an alkaline fluid. The patterning by this method can reproduce uniform line width. In addition, due to the highest conductivity of silver among all metals, a thinner line with a higher conductivity can be achieved as compared with other methods. An additional advantage is that a layer having a metal pattern obtained by this method has a higher flexibility, i.e. a longer flexing life as compared with an ITO conductive layer.

When an optically transparent conductive material having, on an optically transparent support, such a metal pattern as described above is placed over a liquid crystal display, the cycle of the metal pattern and the cycle of the liquid crystal display element interfere with each other, causing a problem of moire. In recent years, liquid crystal displays of different resolutions have been used, which further complicates the above-mentioned problem.

As a solution to this problem, suggested in Patent Literature 7, 8, 9, 10, etc., for example, is a method in which the interference is suppressed by using, as the metal thin line pattern, a traditional random diagram described in, for example, "Mathematical Models of Territories, Introduction to Mathematical Engineering through Voronoi diagrams" (Non Patent Literature 1).

CITATION LIST

Patent Literature

Patent Literature 1: JP 2013-30378 A
Patent Literature 2: JP 2007-287994 A
Patent Literature 3: JP 2007-287953 A
Patent Literature 4: JP 2003-77350 A
Patent Literature 5: JP 2005-250169 A
Patent Literature 6: JP 2007-188655 A
Patent Literature 7: JP 2011-216377 A
Patent Literature 8: JP 2013-37683 A
Patent Literature 9: JP 2014-17519 A
Patent Literature 10: JP 2013-540331 T Non Patent Literature Non Patent Literature 1: *Mathematical Models of Territories—Introduction to Mathematical Engineering through Voronoi diagrams*—(published by Kyoritsu Shuppan in February, 2009)

SUMMARY OF INVENTION

Technical Problem

When an optically transparent conductive material is used as an electrode (optically transparent electrode) of a projected capacitive touchscreen, a plurality of sensor parts are provided on an optically transparent support, as described later. In such a random metal pattern as mentioned above, a part where the distribution of the metal thin line is sparse and a part where the distribution is dense randomly appear, and the electrical properties of the sensor parts vary in some cases. As a result, decrease in detection sensitivity or significant variation that cannot be absorbed by the correction of the detection circuit etc. may occur, which makes the optically transparent conductive material unusable.

An objective of the present invention is to provide a pattern formation method for producing a random metal pattern which does not cause moire even when placed over a liquid crystal display and which achieves improved detection sensitivity due to compressed (reduced) variation in electrical properties among sensors.

Solution to Problem

The above objective is basically achieved by the following invention.

(1) A method of forming a patterned optically transparent and electrically conductive assembly comprising an optically transparent and electrically conductive layer on an optically transparent support, the optically transparent and electrically conductive layer having sensor parts electrically connected to terminal parts and dummy parts not electrically connected to terminal parts, comprising the steps of:

providing a metal mesh pattern comprising the sensor parts and the dummy parts, said metal mesh pattern of the sensor parts and the dummy parts being formed of a Voronoi diagram generated from a plurality of generators disposed on a plane, with the generators being disposed in original polygons tiling the plane such that one generator exists in each original polygon, each original polygon having a gravity center;

enlarging at least some of the original polygons containing the generators in the dummy parts at a ratio (A), the enlarged polygons of the generators in the dummy parts sharing the gravity centers of the original polygons of the generators in the dummy parts and/or reducing at least some of the original polygons containing the generators in the sensor parts at a ratio (B), the reduced polygons of the generators in the sensor parts sharing the gravity centers of the original polygons of the generators in the sensor parts;

providing said optically transparent support; and forming on said optically transparent support the metal mesh pattern comprising said enlarged polygons of the generators in the dummy parts and/or said reduced polygons of the generators in the sensor parts, wherein at least some of the polygons of the generators in the dummy parts are larger than at least some of the polygons of the generators in the sensor parts.

Advantageous Effects of Invention

The present invention provides a pattern formation method for producing a random metal pattern which does not cause moire even when placed over a liquid crystal display and which compresses (reduces) the variation in electrical properties among sensors.

DESCRIPTION OF EMBODIMENTS

Hereinafter, the present invention will be described in detail with reference to drawings, but the present invention is not limited to the embodiments described below and can be embodied in various ways without departing from the technical scope of the invention.

Figure 1:
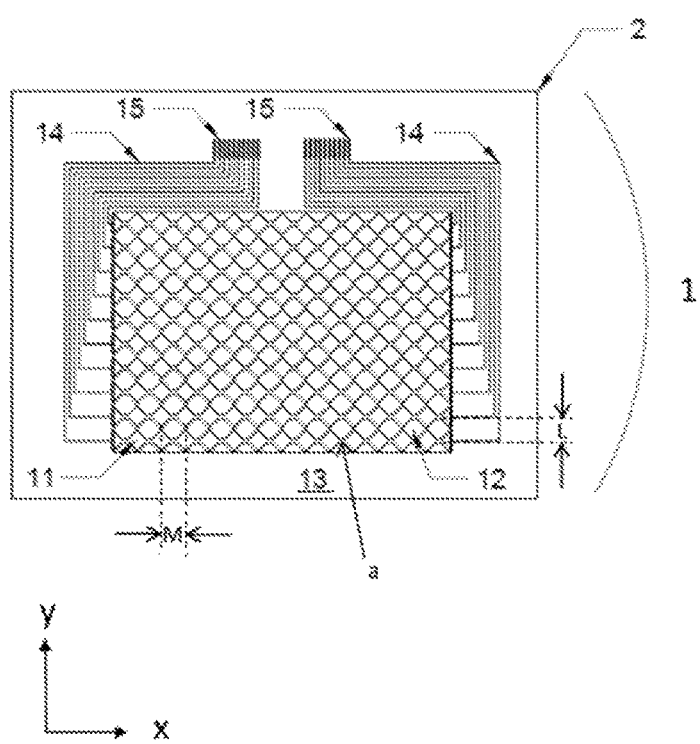
FIG. 1 is a schematic view showing an example of the optically transparent conductive material obtained according to the present invention.

FIG. 1 is a schematic view showing an example of the optically transparent conductive material obtainable according to the present invention. In FIG. 1, an optically transparent conductive material 1 has, on at least one surface of an optically transparent support 2, a sensor part 11 and a dummy part 12 formed of a metal mesh pattern, a peripheral wire part 14, a terminal part 15, and a non-image part 13 not having any pattern. The borders between the regions of the sensor part 11 and the dummy part 12, which are formed of a metal mesh pattern, are conveniently shown by a boundary line "a" (non-existent line).

The sensor part 11 is electrically connected, via a peripheral wire part 14, to a terminal part 15. By electrically connecting the terminal part 15 to the outside, the changes in capacitance detected by the sensor part 11 can be captured. Meanwhile, metal patterns not electrically connected to the terminal part 15 all serve as dummy parts 12 in the present invention. In the present invention, the peripheral wire part 14 and the terminal part 15 need not particularly have optical transparency, and therefore may either be a solid pattern (a pattern without optical transparency) or be such a metal mesh pattern having optical transparency as the sensor part 11 and the dummy part 12.

In FIG. 1, the sensor parts 11 of the optically transparent conductive material 1 are column electrodes extending in a first direction (x direction in the figure) in the plane of the optically transparent conductive layer. The columns of the sensor parts 11 are arranged in the second direction (y direction in the figure) in such a manner that each dummy part 12 is sandwiched between every two of the sensor parts in the plane of the optically transparent conductive layer. The columns of the sensor parts 11 are preferably arranged at a certain cycle L in the second direction (y direction) as in FIG. 1. The cycle L of the sensor parts 11 may be set at any length in such a range that the resolution appropriate for a touch sensor can be maintained. The width of the shape of the sensor part 11 may be constant, but it is also possible that the shape has a pattern cycle in the first direction (x direction) as shown in FIG. 1. FIG. 1 shows an example in which the sensor part 11 is narrowed at a cycle of M (an example of a diamond pattern). The width of the sensor part 11 (the width of the unnarrowed portions in the diamond pattern) may also be set at any value in such a range that the resolution appropriate for a touch sensor can be maintained, and accordingly the shape and the width of the dummy part 12 may also be freely set.

Figure 2:
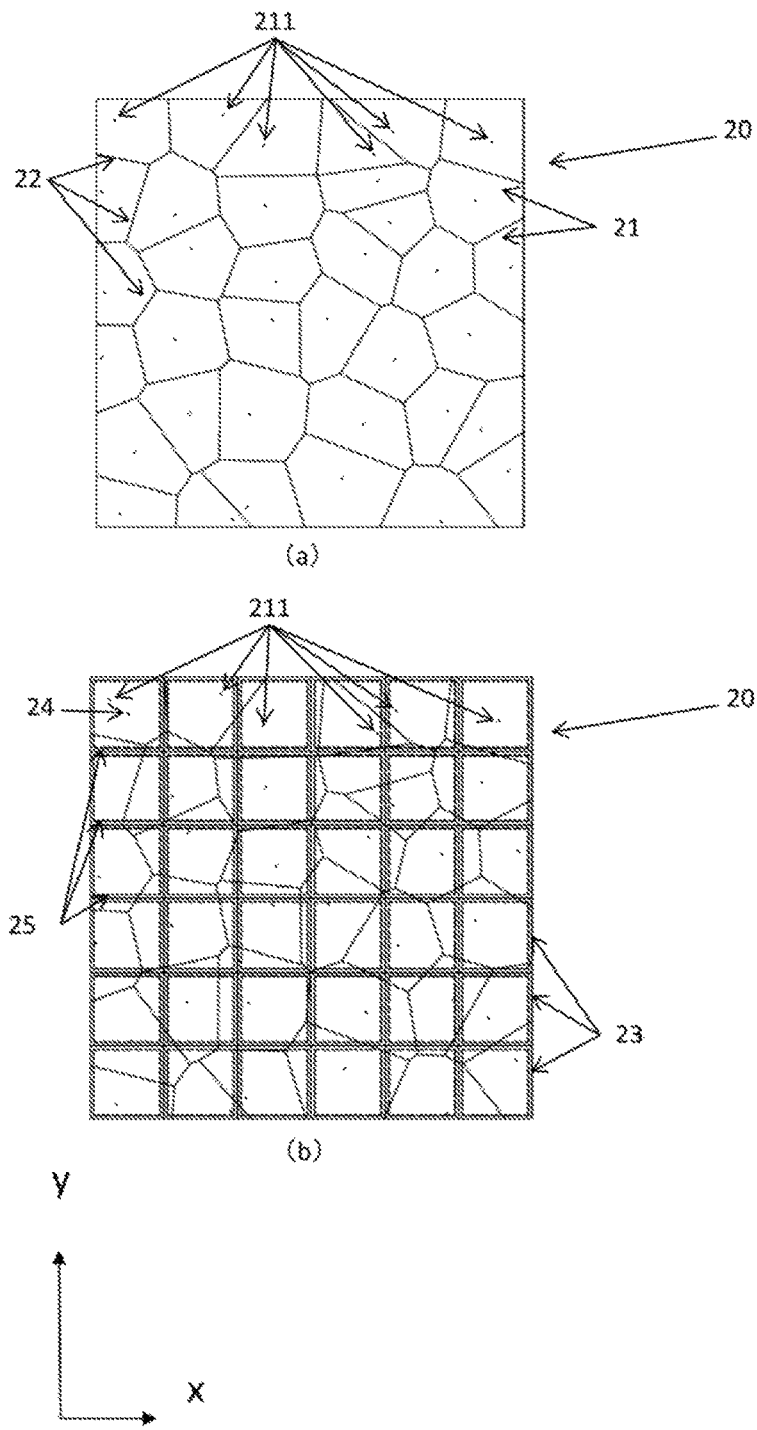
FIGS. 2(*a*) and 2(*b*) illustrate a Voronoi diagram used in the present invention.

In the present invention, the sensor parts 11 and the dummy parts 12 are formed of a metal mesh pattern, and the metal mesh pattern has a mesh shape formed of Voronoi edges generated based on generators (hereinafter described as a Voronoi diagram). Voronoi diagrams are publicly known diagrams applied in various fields including the field of information processing. FIG. 2 is for illustrating a Voronoi diagram used in the present invention. In FIG. 2a, generators 211 are disposed on a plane 20. The plane 20 is divided by boundary lines 22 in such a manner that a region 21 closest to a generator 211 is separated from other regions 21 each closest to a different generator 211. The boundary lines 22 each between two different regions 21 are called Voronoi edges. A Voronoi edge is a part of the perpendicular bisector of the line segment connecting a generator to an adjacent generator. A Voronoi diagram is a diagram as a collection of Voronoi edges.

Methods for disposing generators will be described referring to FIG. 2b. In the method used in the present invention, a plane 20 is divided into polygons and generators 211 are randomly disposed in such a manner that one generator is present in each polygon. For dividing the plane 20, the plane 20 is tiled using a plurality of polygons of a single kind or of two or more kinds (hereinafter, referred to as original polygons). Subsequently, the original polygons are enlarged or reduced at an arbitrary ratio in such a manner that each of the resulting enlarged or reduced polygons shares its gravity center with the respective original polygon. Then, the plane 20 is divided by the enlarged or reduced polygons, which may be the same as the original polygons. In more detail, the plane 20 is divided by enlarged or reduced polygons (including those of the same size as the original polygons) generated by enlarging or reducing the original polygons at an arbitrary ratio in such a manner that each vertex of the original polygon is relocated to a position on a line connecting the gravity center of the original polygon and the original vertex or on the extended line thereof. After dividing the plane 20 in this way, in each enlarged or reduced polygon, a generator is randomly disposed. In FIG. 2b, the plane 20 is tiled using original polygons 23, which are squares, subsequently the original polygons are reduced to generate reduced polygons 25 by connecting points at 90% of the distance from the gravity center 24 to each vertex of the original polygons, and then generators 211 are randomly disposed in the reduced polygons 25 in such a manner that one generator is present in each polygon.

In the present invention, in order to prevent "grains", preferred is tiling using original polygons 23 of a single shape and a single size, as shown in FIG. 2b. "Grains" is a phenomenon in which high-density portions and low-density portions appear in the pattern of a random diagram. The size of the enlarged or reduced polygon is preferably such that the distance from the gravity center to each vertex of the enlarged or reduced polygon is 10 to 300% of the distance from the gravity center to each vertex of the original polygon. When the ratio exceeds 300%, grains may appear, and when the ratio is less than 10%, the Voronoi diagram retains high regularity, causing moire when placed over a liquid crystal display.

As the shape of the original polygon, preferred are a quadrangle, such as a square, a rectangle, and a rhombus; a triangle; and a hexagon. From the viewpoint of preventing the phenomenon of grains, preferred among them is a quadrangle, and further preferred is a rectangle of which the ratio of the longer side and the shorter side is 1:0.8 to 1:1. The length of one side of the original polygon is preferably 100 to 2000 μm, and more preferably 120 to 800 μm. In the present invention, the Voronoi edge is most preferably a straight line, but a curved line, a wavy line, a zigzag line, etc. may also be used. The line width of the metal pattern in the sensor parts 11 and the dummy parts 12 is preferably 1 to 20 μm, more preferably 2 to 7 μm for achieving both conductivity and optical transparency.

Figure 3:
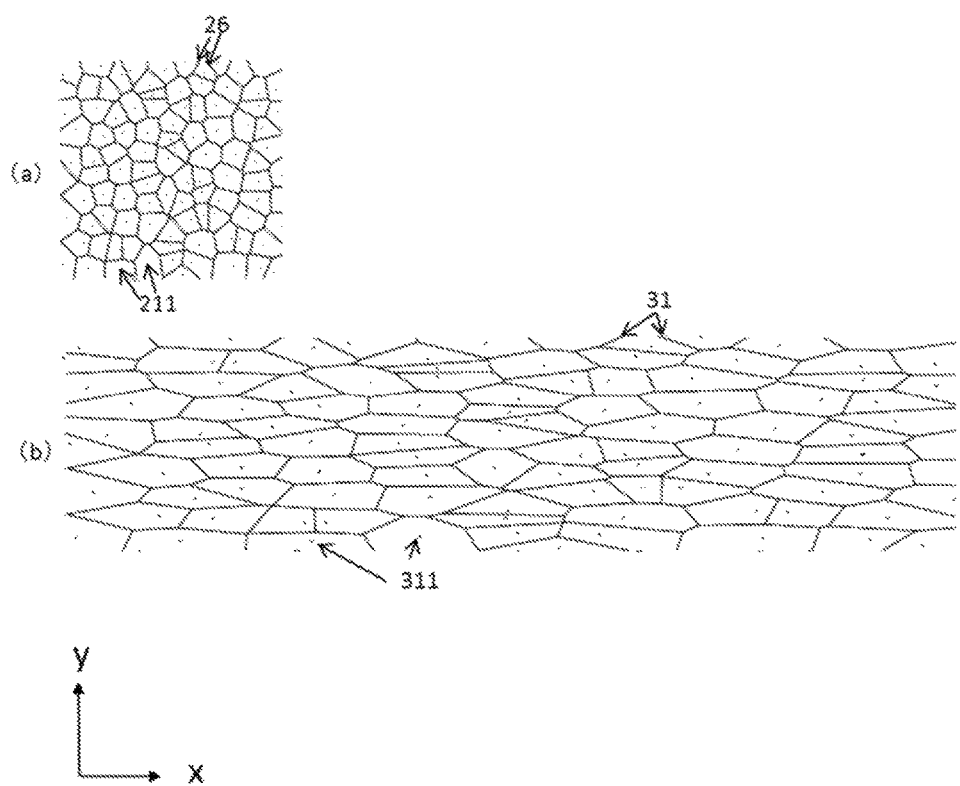
FIGS. 3(*a*) and 3(*b*) illustrate a modification example of a Voronoi diagram used in the present invention.

In the present invention, a diagram obtained by enlarging or reducing, in an arbitrary direction, a Voronoi diagram obtained by the method as described above is also included in the examples of the Voronoi diagram of the present invention. FIG. 3 is for illustrating a modification example of a Voronoi diagram used in the present invention. FIG. 3a illustrates the Voronoi diagram before the enlargement or reduction. FIG. 3b shows a modified pattern obtained by enlarging the pattern having Voronoi edges 26 shown in FIG. 3a four times in the x direction, where scaling in the y direction is not performed. The Voronoi edges 26 in FIG. 3a correspond to the sides 31 in FIG. 3b, and the generators 211 in FIG. 3a correspond to the generators 311 in FIG. 3b.

The Voronoi diagrams of the sensor parts and dummy parts are generated by the method as described above. In the present invention, the arbitrary ratio (A) at which the original polygons in the dummy parts are enlarged or reduced or not resized is different from the arbitrary ratio (B) at which the original polygons in the sensor parts or at least part thereof are enlarged or reduced or not resized, and the arbitrary ratios (A) and (B) satisfy an inequality of A>B. That is, the enlarged or reduced polygons in the dummy parts are larger than those in the sensor parts or at least part thereof, providing larger regions for the disposition of generators. In a preferred embodiment, the distance from the gravity center to each vertex of the enlarged or reduced polygon in the dummy part is 50 to 300% (ratio (A)) of the distance from the gravity center to each vertex of the original polygon, the distance from the gravity center to each vertex of the enlarged or reduced polygon in the sensor part or at least part thereof is 10 to 200% (ratio (B)) of the distance from the gravity center to each vertex of the original polygon, and the ratio (A) and the ratio (B) in the above ranges satisfy A>B. In a further preferred embodiment, the distance from the gravity center to each vertex of the enlarged or reduced polygon in the dummy part is 50 to 200% (ratio (A)) of the distance from the gravity center to each vertex of the original polygon, the distance from the gravity center to each vertex of the enlarged or reduced polygon in the sensor part or at least part thereof is 10 to 100% (ratio (B)) of the distance from the gravity center to each vertex of the original polygon, and the ratio (A) and the ratio (B) in the above ranges satisfy A>B.

That is, when A is a value representing an enlargement ratio (>100%) for obtaining an enlarged polygon from the original polygon or a reduction ratio (<100%) for obtaining a reduced polygon from the original polygon, or a value showing that the original polygon is not resized is used as it is (100%) in the dummy part, and B is a value representing an enlargement ratio (>100%) for obtaining an enlarged polygon of the original polygon or a reduction ratio (<100%) for obtaining a reduced polygon of the original polygon, or a value showing that the original polygon is not resized is used as it is (100%) in the sensor part or at least part thereof, A>B is satisfied. Therefore, it is possible that the original polygons not resized are used as it is in either the dummy part or the sensor part, but it is impossible that the original polygons not resized are used as it is in both the dummy part and the sensor part.

Figure 4:
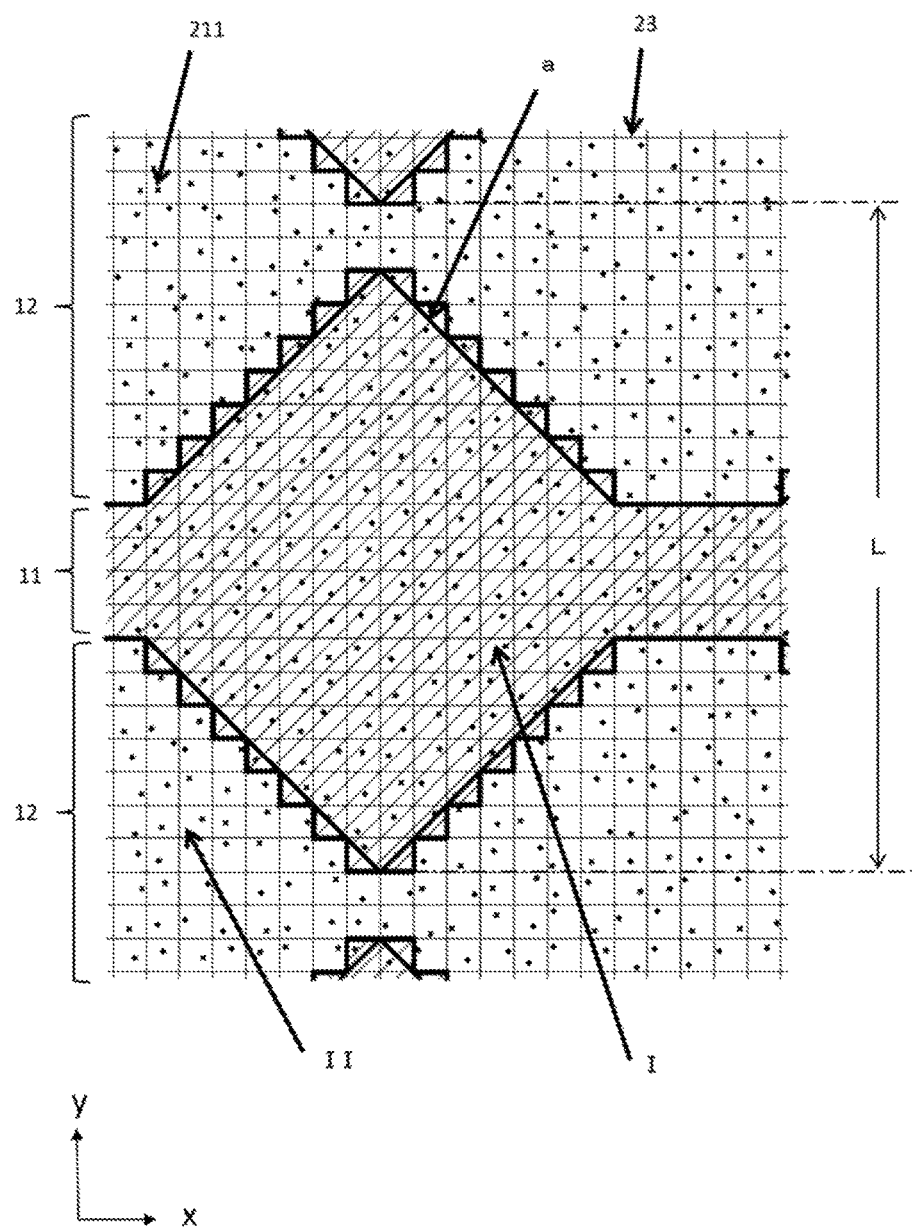
FIG. 4 is a schematic view for showing a method for generating a Voronoi diagram of the present invention.

FIG. 4 is a schematic view for showing a method for generating a Voronoi diagram of the present invention. In FIG. 4, the plane is tiled using original polygons 23 and is divided into the area I (shaded with oblique lines) formed of original polygons 23 at least partly belonging to the sensor parts 11, and the remainder area II. In FIG. 4, the ratio (B) of the sensor part of the present invention is applied to the area I, and the ratio (A) of the dummy part of the present invention is applied to the area II. As described above, it is enough that each of the original polygons included in the area I partly belongs to the sensor part 11, and the area I may extend across the imaginary outline "a" into the dummy part. In FIG. 4, the ratio (A) is set at 80% (in the reduced polygon obtained by reducing the original polygon, the distance from the gravity center to each vertex of the reduced polygon is 80% of the distance from the gravity center to each vertex of the original polygon) and the ratio (B) is set at 60% (in the reduced polygon obtained by reducing the original polygon, the distance from the gravity center to each vertex of the reduced polygon is 60% of the distance from the gravity center to each vertex of the original polygon) to provide reduced polygons (not shown) in the dummy part 12 and the sensor part 11, and generators 211 are randomly disposed in the reduced polygons.

Figure 5:
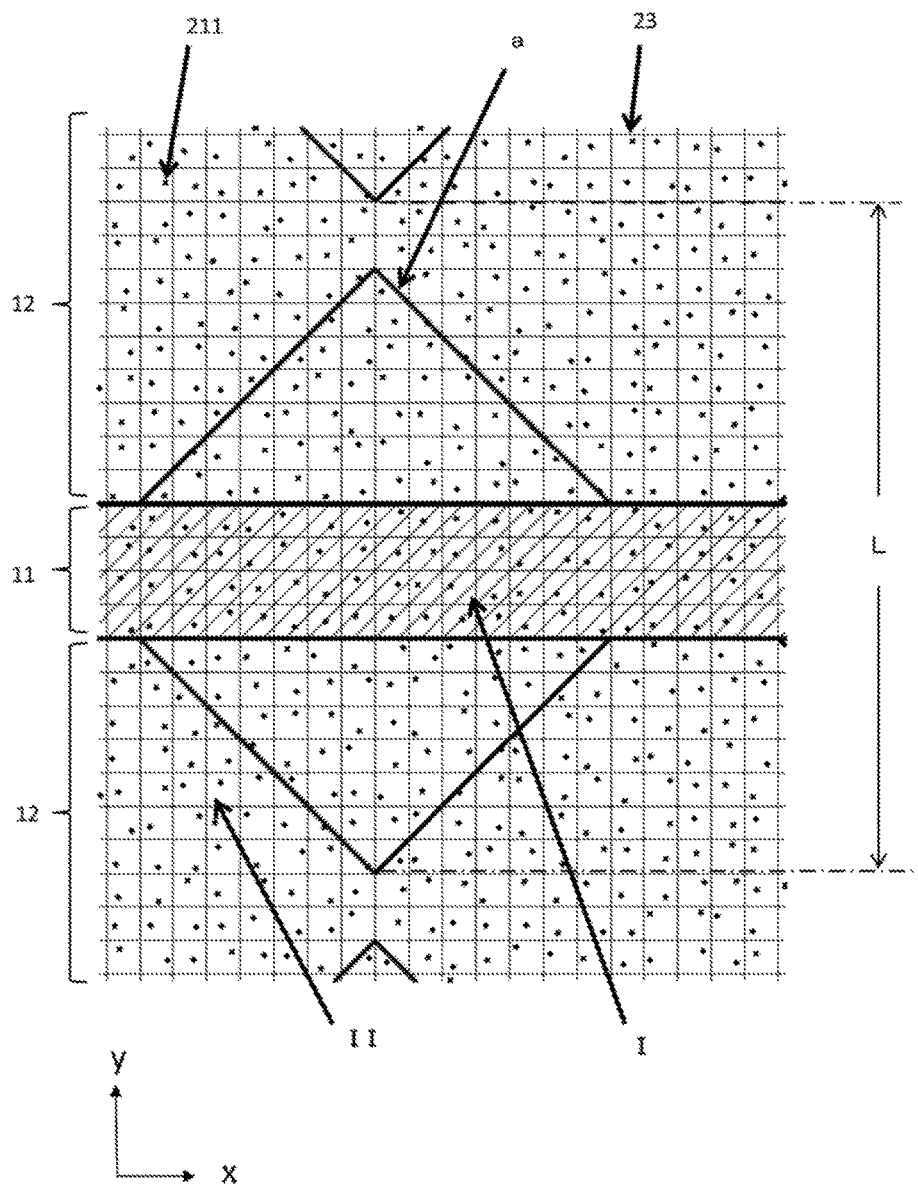
FIG. 5 is another schematic view for showing a method for generating a Voronoi diagram of the present invention.

FIG. 5 is another schematic view for showing a method for generating a Voronoi diagram of the present invention. In FIG. 5, the plane is tiled using original polygons 23 and is divided into the area I (shaded with oblique lines) formed of part of original polygons 23 belonging to the sensor part 11, and the remainder area II. In FIG. 5, the ratio (B) of the sensor part of the present invention is applied to the area I, and the ratio (A) of the dummy part of the present invention is applied to the area II. In FIG. 5, the ratio (A) is set at 70% (in the reduced polygon obtained by reducing the original polygon, the distance from the gravity center to each vertex of the reduced polygon is 70% of the distance from the gravity center to each vertex of the original polygon) and the ratio (B) is set at 60% (in the reduced polygon obtained by reducing the original polygon, the distance from the gravity center to each vertex of the reduced polygon is 60% of the distance from the gravity center to each vertex of the original polygon) to provide reduced polygons (not shown) in the dummy part 12 and the sensor part 11, and generators 211 are randomly disposed in the reduced polygons.

Figure 6:
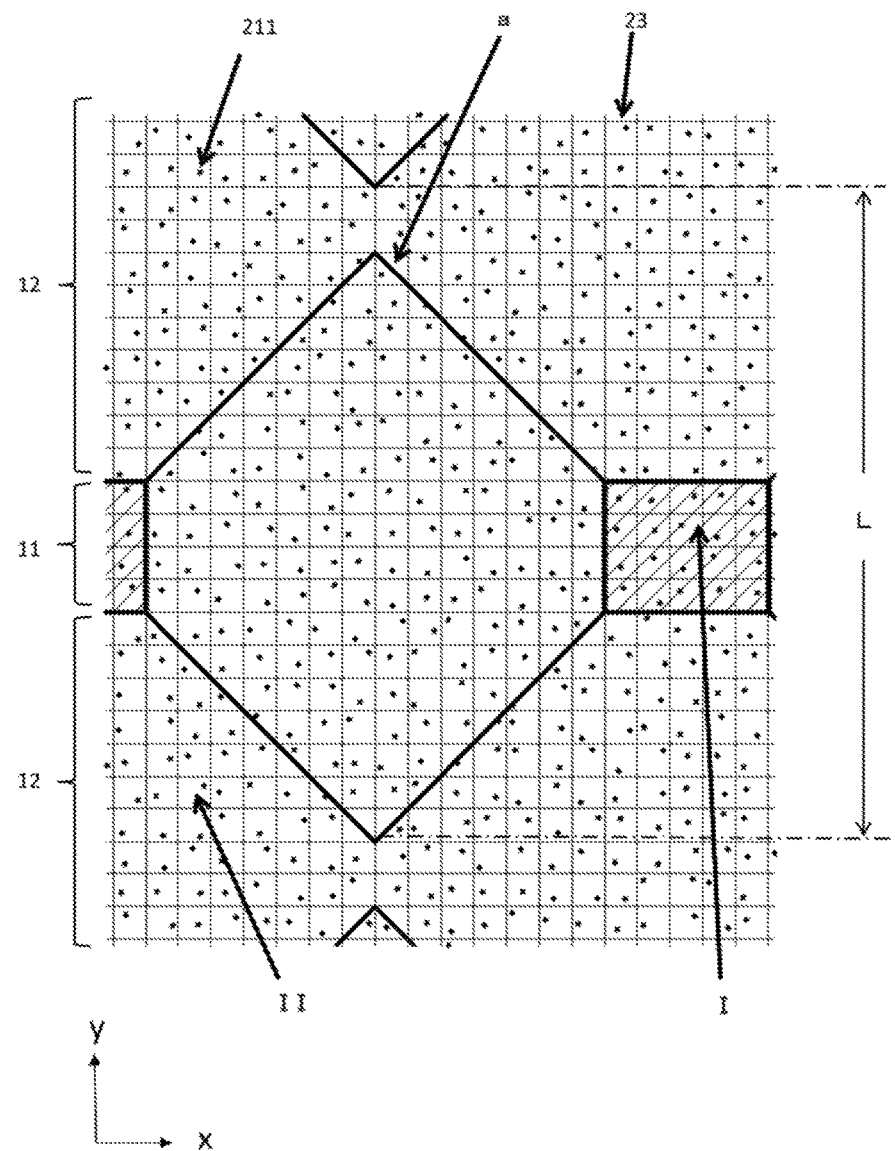
FIG. 6 is another schematic view for showing a method for generating a Voronoi diagram of the present invention.

FIG. 6 is another schematic view for showing a method for generating a Voronoi diagram of the present invention. In FIG. 6, the plane is tiled using original polygons 23 and is divided into the area I (shaded with oblique lines) formed of part of original polygons 23 belonging to the sensor part 11, and the remainder area II. In FIG. 6, the ratio (B) of the sensor part of the present invention is applied to the area I, and the ratio (A) of the dummy part of the present invention is applied to the area II. In FIG. 6, the ratio (A) is set at 70% (in the reduced polygon obtained by reducing the original polygon, the distance from the gravity center to each vertex of the reduced polygon is 70% of the distance from the gravity center to each vertex of the original polygon) and the ratio (B) is set at 50% (in the reduced polygon obtained by reducing the original polygon, the distance from the gravity center to each vertex of the reduced polygon is 50% of the distance from the gravity center to each vertex of the original polygon) to provide reduced polygons (not shown) in the dummy part 12 and the sensor part 11, and generators 211 are randomly disposed in the reduced polygons.

In the present invention, generators in at least part of the sensor parts are each provided in an enlarged or reduced polygon that shares the gravity center with a polygon used in the tiling of the plane and is obtained by enlarging or reducing the polygon at an arbitrary ratio (B) or is the polygon as it is. Here, the "at least part of the sensor parts" means that the percentage of the area where generators are disposed in the above-described enlarged or reduced polygons is at least 5% or more, preferably 10% or more, relative to the entire area of the sensor parts. The area I to which the ratio (B) is applied is preferably provided at the center area in the width direction of the sensor part 11 (the band-like area having the same width as the narrowest width of the sensor part 11) as shown in FIG. 5, and is more preferably provided at parts where the sensor part 11 has the narrowest width as shown in FIG. 6. The narrowest part of the sensor part 11 most significantly influences the sensor performance (electrical properties etc.), and therefore, in such preferable embodiments, even if the area I is small relative to the entire sensor part, the variation of electrical properties among sensors is reduced, which is particularly efficient.

As described above, to generate Voronoi edges in the present invention, a plane is tiled using polygons, and subsequently, the polygons are enlarged or reduced at an arbitrary ratio or are used as they are to prepare enlarged or reduced polygons. Then, the plane is divided by the enlarged or reduced polygons, and generators are randomly disposed therein. Regarding the plane, it is possible that the entire region consisting of the sensor parts 11 and the dummy parts 12 in FIG. 1 is treated as the plane 20 in FIG. 2, but it is also possible that the region consisting of the sensor parts 11 and the dummy parts 12 is divided into smaller regions and each of the regions is treated as the plane 20 in FIG. 2. In the latter case, when all the smaller regions resulting from the division are of the same size, a metal pattern forming one region may be used as a unit graphic, and by repeating the unit graphic, the overall metal pattern can be formed.

In the present invention, there is no electrical connection between the sensor part and the dummy part. The dummy part 12 is produced by providing a metal pattern with a line break, for example, at a position along the imaginary outline "a" shown in FIG. 1 described above. A plurality of line breaks may be provided not only at positions along the imaginary outline "a" but also at any positions in the dummy part. The length of the line break is preferably 3 to 100 μm, and more preferably 5 to 20 μm.

In the present invention, the sensor part 11 and the dummy part 12 are formed of a metal mesh pattern. The metal is preferably gold, silver, copper, nickel, aluminum, and a composite material thereof. From the viewpoint of production efficiency, it is preferred that the peripheral wire part 14 and the terminal part 15 are also made of a metal having the same composition as that of the sensor part 11 and the dummy part 12. As the method for forming the metal pattern, publicly known methods can be used, and the examples thereof include a method in which a silver halide photosensitive material is used; a method in which, after a silver image is obtained by the aforementioned method, electroless plating or electrolytic plating of the silver image is performed; a method in which screen printing with use of a conductive ink, such as a silver paste and a copper paste, is performed; a method in which inkjet printing with use of a conductive ink, such as a silver ink and a copper ink, is performed; a method in which the metal pattern is obtained by forming a conductive layer by evaporation coating or sputtering, forming a resist film thereon, exposing, developing, etching, and removing the resist layer; and a method in which a metal pattern is obtained by placing a metal foil, such as a copper foil, forming a resist film thereon, exposing, developing, etching, and removing the resist layer. Among them, the silver halide diffusion transfer process is preferred because it allows reduction in the thickness of the metal pattern to be produced and easy formation of an extremely microscopic metal pattern.

If the metal pattern produced by the above-mentioned method is too thick, the subsequent processes (for example, adhesion to another member etc.) may become difficult to carry out, and if the metal pattern is too thin, the conductivity required of touchscreens can hardly be achieved. Therefore, the thickness is preferably 0.01 to 5 μm, and more preferably 0.05 to 1 μm.

In the optically transparent conductive material of the present invention, the total light transmittance of the sensor parts 11 and the dummy parts 12 is preferably 80% or higher, more preferably 85% or higher, and particularly preferably 88.5% or higher. The difference in the total light transmittance between the sensor parts 11 and the dummy parts 12 is preferably within 0.5%, more preferably within 0.1%, and further more preferred is that the total light transmittance of the sensor parts 11 is equal to that of the dummy parts 12. The sensor parts 11 and the dummy parts 12 each preferably have a haze value of 2 or less. Also, regarding the color phase of the sensor parts 11 and the dummy parts 12, the b* value in the CIELAB color space is preferably 2 or less, and more preferably 1 or less.

As the optically transparent support of the optically transparent conductive material, a publicly known support which has optical transparency and which is made of, for example, glass, a polyester resin such as polyethylene terephthalate (PET) or polyethylene naphthalate (PEN), an acrylate resin, an epoxy resin, a fluororesin, a silicone resin, a polycarbonate resin, a diacetate resin, a triacetate resin, a polyarylate resin, polyvinyl chloride, a polysulfone resin, a polyether sulfone resin, a polyimide resin, a polyamide resin, a polyolefine resin, a cyclic polyolefin resin, or the like is preferably used. Here, "optically transparent" means that the total light transmittance is 60% or higher, and the total light transmittance is preferably 80% or higher. The thickness of the optically transparent support is preferably 50 μm to 5 mm. Also, the optically transparent support may be provided with a publicly known layer, such as an antifingerprint layer, a hard coat layer, an antireflection layer, and an antiglare layer.

EXAMPLES

Hereinafter, the present invention will be illustrated in more detail by Examples, but the present invention is not limited thereto and can be embodied in various ways unless it goes beyond the technical scope thereof.
<Optically Transparent Conductive Material 1>

As an optically transparent support, a 100-μm-thick polyethylene terephthalate film was used. The total light transmittance of this optically transparent support was 91%.

Next, in accordance with the following formulation, a physical development nuclei coating liquid was prepared, applied onto the optically transparent support, and dried to provide a physical development nuclei layer.
<Preparation of Palladium Sulfide Sol>

| Liquid A | Palladium chloride | 5 g |
|---|---|---|
| | Hydrochloric acid | 40 mL |
| | Distilled water | 1000 mL |
| Liquid B | Sodium sulfide | 8.6 g |
| | Distilled water | 1000 mL |

Liquid A and Liquid B were mixed with stirring, and after 30 minutes, passed through a column filled up with an ion exchange resin to give a palladium sulfide sol.
<Preparation of Physical Development Nuclei Coating Liquid>
Per $m^2$ of Silver Halide Photosensitive Material

| The above-prepared palladium sulfide sol | 0.4 mg |
|---|---|
| 2 mass % glyoxal aqueous solution | 0.2 mL |
| Surfactant (S-1) | 4 mg |
| Denacol EX-830 (Polyethylene glycol diglycidyl ether made by Nagase Chemtex Corp.) | 50 mg |
| 10 mass % SP-200 aqueous solution (Polyethyleneimine made by Nippon Shokubai Co., Ltd.; average molecular weight: 10,000) | 0.5 mg |

Subsequently, an intermediate layer, a silver halide emulsion layer, and a protective layer, of which the compositions are shown below, were applied in this order (from closest to the optically transparent support) onto the above physical development nuclei layer, and dried to give a silver halide photosensitive material. The silver halide emulsion was produced by a general double jet mixing method for photographic silver halide emulsions. The silver halide emulsion was prepared using 95 mol % of silver chloride and 5 mol % of silver bromide so as to have an average particle diameter of 0.15 μm. The obtained silver halide emulsion was subjected to gold and sulfur sensitization using sodium thiosulfate and chloroauric acid by the usual method. The silver halide emulsion obtained in this way contained 0.5 g of gelatin per gram of silver.
<Composition of Intermediate Layer>
Per $m^2$ of Silver Halide Photosensitive Material

| Gelatin | 0.5 g |
|---|---|
| Surfactant (S-1) | 5 mg |
| Dye 1 | 50 mg |

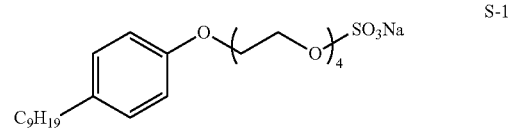

S-1

-continued

Dye 1

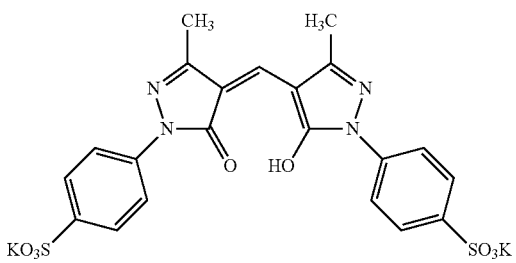

<Composition of Silver Halide Emulsion Layer>
Per m² of Silver Halide Photosensitive Material

| Gelatin | 0.5 g |
|---|---|
| Silver halide emulsion | Equivalent of 3.0 g of silver |
| 1-Phenyl-5-mercaptotetrazole | 3 mg |
| Surfactant (S-1) | 20 mg |

<Composition of Protective Layer>
Per m² of Silver Halide Photosensitive Material

| Gelatin | 1 g |
|---|---|
| Amorphous silica matting agent (average particle diameter: 3.5 μm) | 10 mg |
| Surfactant (S-1) | 10 mg |

Figure 7:
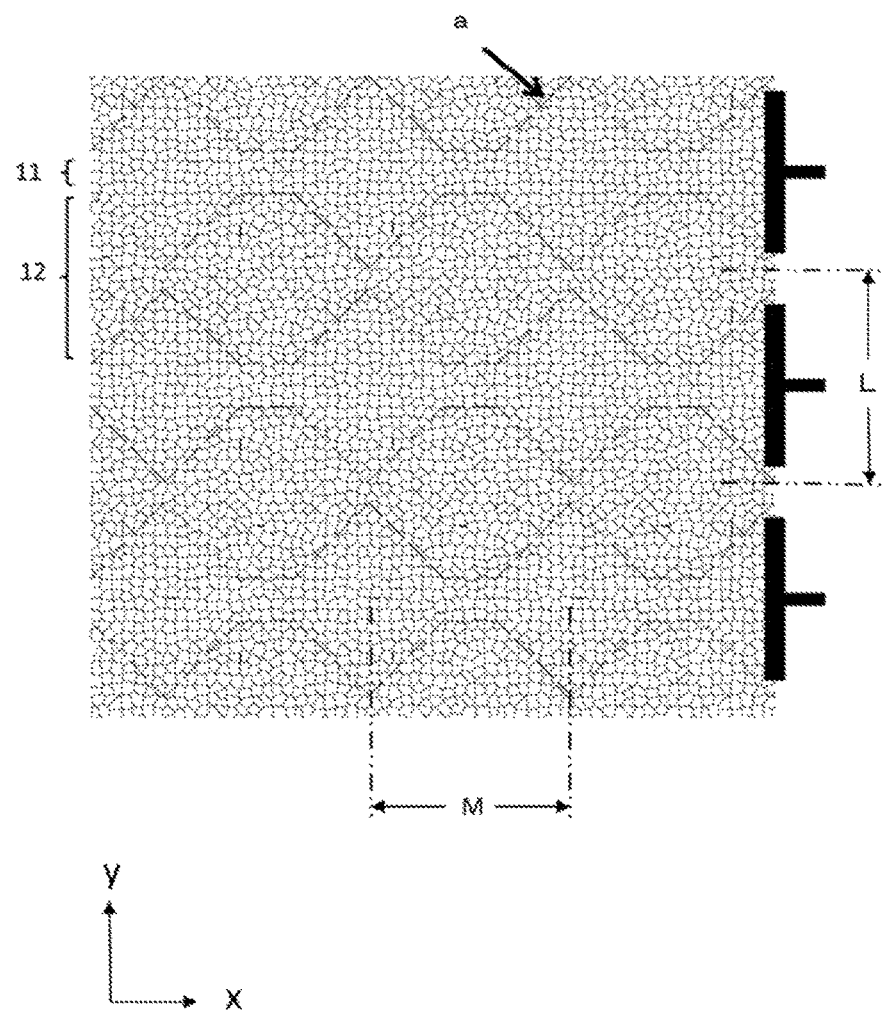
FIG. 7 is an enlarged view of a part of a transparent manuscript used in the Examples.

The silver halide photosensitive material obtained as above was brought into close contact with a transparent manuscript having the pattern image shown in FIG. 1, and exposure was performed, through a resin filter which cuts off light of 400 nm or less, using a contact printer having a mercury lamp as a light source. In the transparent manuscript, the cycle L of the sensor part 11 is 5.3 mm, and the cycle M of the narrowed part of the diamond pattern in the sensor part 11 is 5.0 mm. FIG. 7 is an enlarged view of a part of a transparent manuscript used in the Examples.

In the transparent manuscript having the pattern image of FIG. 1 and FIG. 7, the metal pattern in the sensor part 11 and the dummy part 12 is a Voronoi diagram generated based on generators shown in FIG. 4. In FIG. 4, a square of which the length of a side in the x direction is 0.26 mm and the length of a side in the y direction is 0.26 mm is used as an original polygon, and this original polygon is repeatedly arranged in the x direction and the y-direction to tile the plane. For each of the original polygons belonging to the area I shown in FIG. 4, a reduced polygon is generated by relocating each vertex of the original polygon to a position at 60% (ratio (B)) of the distance from the gravity center to the vertex of the original polygon, and a generator is randomly disposed in the reduced polygon. Also, for each of the original polygons belonging to the area II shown in FIG. 4, a reduced polygon is generated by relocating each vertex of the original polygon to a position at 80% (ratio (A)) of the distance from the gravity center to the vertex of the original polygon, and a generator is randomly disposed in the reduced polygon. After that, a region closest to a generator is separated, by an outline, from other regions each closest to a different generator. This procedure is repeated for all the generators to produce a pattern diagram to be used as a transparent manuscript. The line width in the Voronoi diagram is 5 μm. Thin lines on the boundary between the sensor parts and the dummy parts are provided with line breaks 20 μm in length. The total light transmittance of the sensor parts and the dummy parts is 89.0%.

After immersion in the diffusion transfer developer having the composition shown below at 20° C. for 60 seconds, the silver halide emulsion layer, the intermediate layer, and the protective layer were washed off with warm water at 40° C., and a drying process was performed. By repeating this process 100 times, 100 sheets of the optically transparent conductive material 1 having a metal silver image of the pattern of FIG. 1 and FIG. 7 as an optically transparent conductive layer were obtained. The metal silver image of the optically transparent conductive layer of the obtained optically transparent conductive material 1 had the same shape and line width as those of the image of the transparent manuscript having the pattern of FIG. 1 and FIG. 7. The film thickness of the metal silver image measured with a confocal microscope was 0.1 μm.

<Composition of Diffusion Transfer Developer>

| Potassium hydroxide | 25 g |
|---|---|
| Hydroquinone | 18 g |
| 1-Phenyl-3-pyrazolidone | 2 g |
| Potassium sulfite | 80 g |
| N-methylethanolamine | 15 g |
| Potassium bromide | 1.2 g |

Water was added to the above ingredients to make the total volume of 1000 mL, and the pH was adjusted to 12.2.

<Optically Transparent Conductive Material 2>

A pattern diagram was obtained in the same manner as in the preparation of the transparent manuscript used in the preparation of the optically transparent conductive material 1, except that, in the transparent manuscript, for each of the original polygons belonging to the area I shown in FIG. 4, an enlarged or reduced polygon is generated by locating each vertex of the original polygon at a position at 100% (ratio (B)) of the distance from the gravity center to the vertex of the original polygon, and for each of the original polygons belonging to the area II shown in FIG. 4, a reduced polygon is generated by relocating each vertex of the original polygon to a position at 80% (ratio (A)) of the distance from the gravity center to the vertex of the original polygon. Except for using the thus-obtained pattern diagram as the transparent manuscript, the same procedure was performed as in the preparation of the optically transparent conductive material 1 to obtain the optically transparent conductive material 2. The metal silver image of the optically transparent conductive layer of the obtained optically transparent conductive material 2 had the same shape and line width as those of the above-described transparent manuscript.

<Optically Transparent Conductive Material 3>

A pattern diagram was obtained in the same manner as in the preparation of the transparent manuscript used in the preparation of the optically transparent conductive material 1, except that, in the transparent manuscript, for each of the original polygons belonging to the area I shown in FIG. 4, a reduced polygon is generated by relocating each vertex of the original polygon at a position at 80% (ratio (B)) of the distance from the gravity center to the vertex of the original polygon, and for each of the original polygons belonging to the area II shown in FIG. 4, a reduced polygon is generated by relocating each vertex of the original polygon to a position at 80% (ratio (A)) of the distance from the gravity center to the vertex of the original polygon. Except for using the thus-obtained pattern diagram as the transparent manuscript, the same procedure was performed as in the preparation of the optically transparent conductive material 1 to obtain the optically transparent conductive material 3. The metal silver image of the optically transparent conductive layer of the obtained optically transparent conductive material 3 had the same shape and line width as those of the above-described transparent manuscript.

<Optically Transparent Conductive Material 4>

A pattern diagram was obtained in the same manner as in the preparation of the transparent manuscript used in the preparation of the optically transparent conductive material 1, except that, in the transparent manuscript, for each of the original polygons belonging to the area I shown in FIG. 4, a reduced polygon is generated by relocating each vertex of the original polygon at a position at 80% (ratio (B)) of the distance from the gravity center to the vertex of the original polygon, and for each of the original polygons belonging to the area II shown in FIG. 4, a reduced polygon is generated by relocating each vertex of the original polygon to a position at 60% (ratio (A)) of the distance from the gravity center to the vertex of the original polygon. Except for using the thus-obtained pattern diagram as the transparent manuscript, the same procedure was performed as in the preparation of the optically transparent conductive material 1 to obtain the optically transparent conductive material 4. The metal silver image of the optically transparent conductive layer of the obtained optically transparent conductive material 4 had the same shape and line width as those of the above-described transparent manuscript.

<Optically Transparent Conductive Material 5>

A pattern diagram was obtained in the same manner as in the preparation of the transparent manuscript used in the preparation of the optically transparent conductive material 1, except that, in the transparent manuscript, for each of the original polygons belonging to the area I shown in FIG. 4, a reduced polygon is generated by relocating each vertex of the original polygon at a position at 60% (ratio (B)) of the distance from the gravity center to the vertex of the original polygon, and for each of the original polygons belonging to the area II shown in FIG. 4, a reduced polygon is generated by relocating each vertex of the original polygon to a position at 60% (ratio (A)) of the distance from the gravity center to the vertex of the original polygon. Except for using the thus-obtained pattern diagram as the transparent manuscript, the same procedure was performed as in the preparation of the optically transparent conductive material 1 to obtain the optically transparent conductive material 5. The metal silver image of the optically transparent conductive layer of the obtained optically transparent conductive material 5 had the same shape and line width as those of the above-described transparent manuscript.

<Optically Transparent Conductive Material 6>

A transparent manuscript having the pattern image of FIG. 1 and FIG. 7 where the metal pattern in the sensor part 11 and the dummy part 12 is a Voronoi diagram generated based on generators shown in FIG. 5 was used. In FIG. 5, a square of which the length of a side in the x direction is 0.26 mm and the length of a side in the y direction is 0.26 mm is used as an original polygon, and this original polygon is repeatedly arranged in the x direction and the y-direction to tile the plane. The area I is provided at the center area in the width direction of the sensor part 11 (the band-like area having the same width as the narrowest width of the sensor part 11). A pattern diagram was obtained in the same manner as in the preparation of the transparent manuscript used in the preparation of the optically transparent conductive material 1, except that, in the production of a Voronoi diagram in the transparent manuscript, for each of the original polygons belonging to the area I shown in FIG. 5, a reduced polygon is generated by relocating each vertex of the original polygon to a position at 60% (ratio (B)) of the distance from the gravity center to the vertex of the original polygon, and a generator is randomly disposed in the reduced polygon, and for each of the original polygons belonging to the area II shown in FIG. 5, a reduced polygon is generated by relocating each vertex of the original polygon to a position at 70% (ratio (A)) of the distance from the gravity center to the vertex of the original polygon, and a generator is randomly disposed in the reduced polygon. Except for using the thus-obtained pattern diagram as the transparent manuscript, the same procedure was performed as in the preparation of the optically transparent conductive material 1 to obtain the optically transparent conductive material 6. The metal silver image of the optically transparent conductive layer of the obtained optically transparent conductive material 6 had the same shape and line width as those of the above-described transparent manuscript.

<Optically Transparent Conductive Material 7>

A pattern diagram was obtained in the same manner as in the preparation of the transparent manuscript used in the preparation of the optically transparent conductive material 6, except that, in the transparent manuscript, for each of the original polygons belonging to the area I shown in FIG. 5, a reduced polygon is generated by relocating each vertex of the original polygon at a position at 80% (ratio (B)) of the distance from the gravity center to the vertex of the original polygon, and for each of the original polygons belonging to the area II shown in FIG. 5, a reduced polygon is generated by relocating each vertex of the original polygon to a position at 70% (ratio (A)) of the distance from the gravity center to the vertex of the original polygon. Except for using the thus-obtained pattern diagram as the transparent manuscript, the same procedure was performed as in the preparation of the optically transparent conductive material 1 to obtain the optically transparent conductive material 7. The metal silver image of the optically transparent conductive layer of the obtained optically transparent conductive material 7 had the same shape and line width as those of the above-described transparent manuscript.

<Optically Transparent Conductive Material 8>

A pattern diagram was obtained in the same manner as in the preparation of the transparent manuscript used in the preparation of the optically transparent conductive material 6, except that, in the transparent manuscript, for each of the original polygons belonging to the area I shown in FIG. 5, a reduced polygon is generated by relocating each vertex of the original polygon at a position at 70% (ratio (B)) of the distance from the gravity center to the vertex of the original polygon, and for each of the original polygons belonging to the area II shown in FIG. 5, a reduced polygon is generated by relocating each vertex of the original polygon to a position at 70% (ratio (A)) of the distance from the gravity center to the vertex of the original polygon. Except for using the thus-obtained pattern diagram as the transparent manuscript, the same procedure was performed as in the preparation of the optically transparent conductive material 1 to obtain the optically transparent conductive material 8. The metal silver image of the optically transparent conductive layer of the obtained optically transparent conductive material 8 had the same shape and line width as those of the above-described transparent manuscript.

<Optically Transparent Conductive Material 9>

A pattern diagram was obtained in the same manner as in the preparation of the transparent manuscript used in the preparation of the optically transparent conductive material 6, except that, in the transparent manuscript, for each of the original polygons belonging to the area I shown in FIG. 5, a reduced polygon is generated by relocating each vertex of the original polygon at a position at 70% (ratio (B)) of the distance from the gravity center to the vertex of the original polygon, and for each of the original polygons belonging to the area II shown in FIG. 5, a reduced polygon is generated by relocating each vertex of the original polygon to a position at 50% (ratio (A)) of the distance from the gravity center to the vertex of the original polygon. Except for using the thus-obtained pattern diagram as the transparent manuscript, the same procedure was performed as in the preparation of the optically transparent conductive material 1 to obtain the optically transparent conductive material 9. The metal silver image of the optically transparent conductive layer of the obtained optically transparent conductive material 9 had the same shape and line width as those of the above-described transparent manuscript.

<Optically Transparent Conductive Material 10>

A pattern diagram was obtained in the same manner as in the preparation of the transparent manuscript used in the preparation of the optically transparent conductive material 6, except that, in the transparent manuscript, for each of the original polygons belonging to the area I shown in FIG. 5, a reduced polygon is generated by relocating each vertex of the original polygon at a position at 50% (ratio (B)) of the distance from the gravity center to the vertex of the original polygon, and for each of the original polygons belonging to the area II shown in FIG. 5, a reduced polygon is generated by relocating each vertex of the original polygon to a position at 50% (ratio (A)) of the distance from the gravity center to the vertex of the original polygon. Except for using the thus-obtained pattern diagram as the transparent manuscript, the same procedure was performed as in the preparation of the optically transparent conductive material 1 to obtain the optically transparent conductive material 10. The metal silver image of the optically transparent conductive layer of the obtained optically transparent conductive material 10 had the same shape and line width as those of the above-described transparent manuscript.

<Optically Transparent Conductive Material 11>

A transparent manuscript having the pattern image of FIG. 1 and FIG. 7 where the metal pattern in the sensor part 11 and the dummy part 12 is a Voronoi diagram generated based on generators shown in FIG. 6 was used. In FIG. 6, a square of which the length of a side in the x direction is 0.26 mm and the length of a side in the y direction is 0.26 mm is used as an original polygon, this original polygon is repeatedly arranged in the x direction and the y-direction to tile the plane, and the area I is provided at parts where the sensor part 11 has the narrowest width. A pattern diagram was obtained in the same manner as in the preparation of the transparent manuscript used in the preparation of the optically transparent conductive material 1, except that, in the production of a Voronoi diagram in the transparent manuscript, for each of the original polygons belonging to the area I shown in FIG. 6, a reduced polygon is generated by relocating each vertex of the original polygon to a position at 50% (ratio (B)) of the distance from the gravity center to the vertex of the original polygon, and a generator is randomly disposed in the reduced polygon, and for each of the original polygons belonging to the area II shown in FIG. 6, a reduced polygon is generated by relocating each vertex of the original polygon to a position at 70% (ratio (A)) of the distance from the gravity center to the vertex of the original polygon, and a generator is randomly disposed in the reduced polygon. Except for using the thus-obtained pattern diagram as the transparent manuscript, the same procedure was performed as in the preparation of the optically transparent conductive material 1 to obtain the optically transparent conductive material 11. The metal silver image of the optically transparent conductive layer of the obtained optically transparent conductive material 11 had the same shape and line width as those of the above-described transparent manuscript.

<Optically Transparent Conductive Material 12>

A pattern diagram was obtained in the same manner as in the preparation of the transparent manuscript used in the preparation of the optically transparent conductive material 11, except that, in the transparent manuscript, for each of the original polygons belonging to the area I shown in FIG. 6, a reduced polygon is generated by relocating each vertex of the original polygon at a position at 90% (ratio (B)) of the distance from the gravity center to the vertex of the original polygon, and for each of the original polygons belonging to the area II shown in FIG. 6, a reduced polygon is generated by relocating each vertex of the original polygon to a position at 70% (ratio (A)) of the distance from the gravity center to the vertex of the original polygon. Except for using the thus-obtained pattern diagram as the transparent manuscript, the same procedure was performed as in the preparation of the optically transparent conductive material 1 to obtain the optically transparent conductive material 12. The metal silver image of the optically transparent conductive layer of the obtained optically transparent conductive material 12 had the same shape and line width as those of the above-described transparent manuscript.

<Optically Transparent Conductive Material 13>

A pattern diagram was obtained in the same manner as in the preparation of the transparent manuscript used in the preparation of the optically transparent conductive material 11, except that, in the transparent manuscript, for each of the original polygons belonging to the area I shown in FIG. 6, a reduced polygon is generated by relocating each vertex of the original polygon at a position at 70% (ratio (B)) of the distance from the gravity center to the vertex of the original polygon, and for each of the original polygons belonging to the area II shown in FIG. 6, a reduced polygon is generated by relocating each vertex of the original polygon to a position at 70% (ratio (A)) of the distance from the gravity center to the vertex of the original polygon. Except for using the thus-obtained pattern diagram as the transparent manuscript, the same procedure was performed as in the preparation of the optically transparent conductive material 1 to obtain the optically transparent conductive material 13. The metal silver image of the optically transparent conductive layer of the obtained optically transparent conductive material 13 had the same shape and line width as those of the above-described transparent manuscript.

The obtained optically transparent conductive materials 1 to 13 were evaluated for the visibility and the variation in sensor resistance values according to the procedures shown below.

<Visibility>

Each of the obtained optically transparent conductive materials 1 to 13 was placed on the screen of a 21.5" wide LCD monitor (I2267FWH made by AOC) displaying solid white, and was evaluated based on the following criteria. The level at which moire or grains was obvious by the naked eye was defined as "C", the level at which moire or grains was noticeable as a result of close inspection was defined as "B", and the level at which moire or grains was unnoticeable was defined as "A". The results are shown in Table 1.

<Variation in Sensor Resistance Values>

The resistance value (Ω) between the terminals 15-15 (see FIG. 1) of each of 10 sensor parts was measured for 100 sheets each of the obtained optically transparent conductive materials 1 to 13 using a digital multitester. Based on the obtained measurement values, the variation in sensor resistance values of each optically transparent conductive material was determined as follows. The difference between the maximum value and the minimum value of the resistance values (Ω) of the ten sensors was determined for each of the 100 sheets, and then the average for the 100 sheets was calculated. The results are shown in Table 1.

TABLE 1

| Optically transparent conductive material | Visibility | Variation in sensor resistance values | Note |
| --- | --- | --- | --- |
| 1 | A | 1.6 | Present invention |
| 2 | A | 4.4 | Comparative Example |
| 3 | A | 4.0 | Comparative Example |
| 4 | A | 3.9 | Comparative Example |
| 5 | C | 1.5 | Comparative Example |
| 6 | A | 1.8 | Present invention |
| 7 | A | 4.2 | Comparative Example |
| 8 | A | 3.0 | Comparative Example |
| 9 | B | 2.8 | Comparative Example |
| 10 | C | 1.0 | Comparative Example |
| 11 | A | 2.0 | Present invention |
| 12 | A | 3.8 | Comparative Example |
| 13 | A | 3.6 | Comparative Example |

The results in Table 1 show that the pattern formation method of the present invention provides an optically transparent conductive material having a random metal pattern which does not cause moire even when placed over a liquid crystal display and which compresses (reduces) the variation in resistance values. However, the optically transparent conductive materials of the comparative examples cause moire when placed over a liquid crystal display or lead to greater variation in resistance values.

REFERENCE SIGNS LIST

1 Optically transparent conductive material
2 Optically transparent support
11 Sensor part
12 Dummy part
13 Non-image part
14 Peripheral wire part
15 Terminal part
20 Plane
21 Region
22 Boundary line of region
23 Original polygon
24 Gravity center of original polygon
25 Enlarged or reduced polygon
a Imaginary outline

The invention claimed is:

1. A method of forming a patterned optically transparent and electrically conductive assembly comprising an optically transparent and electrically conductive layer on an optically transparent support, the optically transparent and electrically conductive layer having sensor parts electrically connected to terminal parts and dummy parts not electrically connected to terminal parts, comprising the steps of:

providing a first pattern comprising the sensor parts and the dummy parts, the first pattern of the sensor parts and the dummy parts being formed of a Voronoi diagram generated from a plurality of generators disposed on a plane, with the generators being disposed in original polygons tiling the plane such that one generator exists in each original polygon, each original polygon having a gravity center;

enlarging at least some of the original polygons containing the generators in the dummy parts at a ratio (A), the enlarged polygons of the generators in the dummy parts sharing the gravity centers of the original polygons of the generators in the dummy parts and/or reducing at least some of the original polygons containing the generators in the sensor parts at a ratio (B), the reduced polygons of the generators in the sensor parts sharing the gravity centers of the original polygons of the generators in the sensor parts to form a second pattern;

providing said optically transparent support; and forming on said optically transparent support a metal mesh pattern comprising said second pattern, wherein at least some of the polygons of the generators in the dummy parts are larger than at least some of the polygons of the generators in the sensor parts.

2. The method of forming a patterned optically transparent and electrically conductive assembly according to claim 1, wherein at least some of the original polygons containing the generators in the dummy parts are enlarged and at least some of the original polygons containing the generators in the sensor parts are reduced, and the ratios (A) and (B) satisfy A>B.

* * * * *